US008363997B2

(12) United States Patent
Hou et al.

(10) Patent No.: US 8,363,997 B2
(45) Date of Patent: Jan. 29, 2013

(54) SYSTEM FOR INTELLIGENT PATCHING OF TELECOMMUNICATION CABLES WITH A COMMUNICATION NETWORK

(75) Inventors: Rong Hou, Richardson, TX (US); Daniel W. Macauley, Fishers, IN (US); Danny L. Satterthwaite, Allen, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 408 days.

(21) Appl. No.: 12/640,267

(22) Filed: Dec. 17, 2009

(65) Prior Publication Data

US 2010/0158467 A1 Jun. 24, 2010

Related U.S. Application Data

(60) Provisional application No. 61/139,209, filed on Dec. 19, 2008, provisional application No. 61/222,233, filed on Jul. 1, 2009.

(51) Int. Cl.
*G02B 6/00* (2006.01)
*G02B 6/12* (2006.01)

(52) U.S. Cl. .......................................... 385/135; 385/14

(58) Field of Classification Search .................. 385/135, 385/14
See application file for complete search history.

(56) References Cited

U.S. PATENT DOCUMENTS

| | | | | |
|---|---|---|---|---|
| 5,781,686 A * | 7/1998 | Robinson et al. | ............. | 385/135 |
| 6,778,752 B2 * | 8/2004 | Laporte et al. | ................ | 385/135 |
| 6,798,944 B2 * | 9/2004 | Pfeiffer et al. | .................. | 385/22 |
| 7,233,731 B2 * | 6/2007 | Solheid et al. | ................ | 385/135 |
| 7,457,503 B2 * | 11/2008 | Solheid et al. | ................ | 385/135 |
| 7,496,268 B2 * | 2/2009 | Escoto et al. | ................. | 385/134 |
| 7,751,672 B2 * | 7/2010 | Smith et al. | .................... | 385/135 |
| 2002/0048428 A1 * | 4/2002 | Pfeiffer et al. | ................... | 385/24 |
| 2003/0081441 A1 * | 5/2003 | Pereira et al. | ................. | 363/141 |
| 2003/0206687 A1 * | 11/2003 | Pfeiffer et al. | ................. | 385/22 |
| 2003/0223725 A1 * | 12/2003 | Laporte et al. | ................ | 385/135 |
| 2004/0001686 A1 * | 1/2004 | Smith et al. | .................... | 385/135 |
| 2004/0097138 A1 | 5/2004 | Kha et al. | | |
| 2007/0031100 A1 * | 2/2007 | Garcia et al. | .................. | 385/135 |
| 2007/0081315 A1 | 4/2007 | Mondor et al. | | |
| 2008/0096438 A1 | 4/2008 | Clark et al. | | |
| 2008/0145013 A1 * | 6/2008 | Escoto et al. | ................. | 385/135 |
| 2008/0304804 A1 * | 12/2008 | Zimmel et al. | ................ | 385/139 |
| 2010/0074588 A1 * | 3/2010 | Zimmel et al. | ................ | 385/139 |
| 2010/0329623 A1 * | 12/2010 | Smith et al. | .................... | 385/135 |

FOREIGN PATENT DOCUMENTS

WO WO 00/56111 9/2000

OTHER PUBLICATIONS

The International Search Report and the Written Opinion of PCT/US2009/068621 dated Jun. 2, 2010.

* cited by examiner

*Primary Examiner* — K. Cyrus Kianni
(74) *Attorney, Agent, or Firm* — Myers Bigel Sibley & Sajovec

(57) ABSTRACT

A datacommunications patching system includes: a mounting frame; a first module mounted in the mounting frame and including a plurality of connector ports on one side thereof and first and second connectors on another side thereof; and a backplane that is mounted in the mounting frame. The backplane electrically connects to the first module via the first connector when the first module is mounted in the mounting frame in a first orientation, and wherein the backplane electrically connects to the first module via the second connector when the first module is mounted in the mounting frame in a second orientation that is inverted from the first orientation.

9 Claims, 5 Drawing Sheets

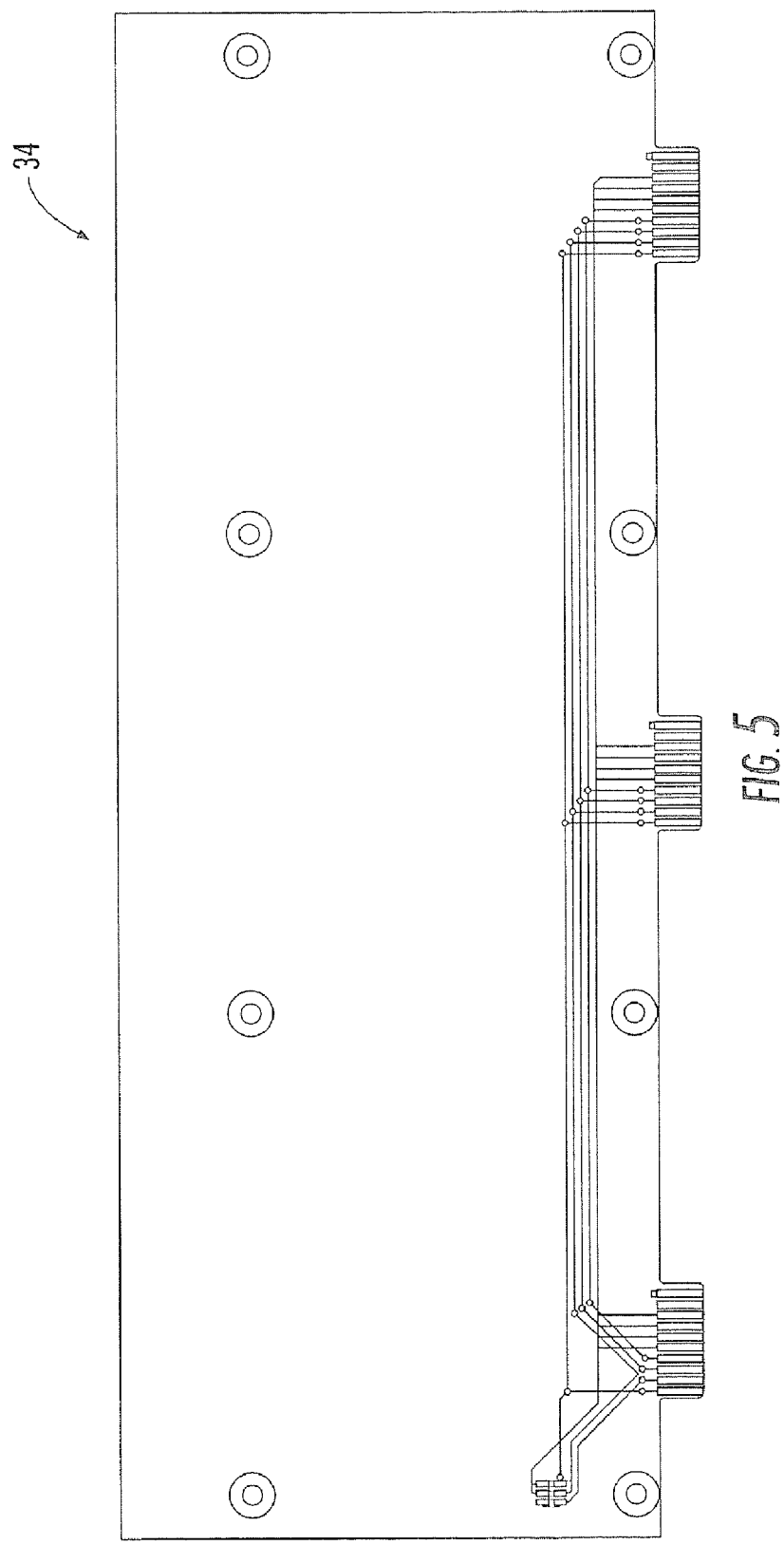

SYSTEM FOR INTELLIGENT PATCHING OF TELECOMMUNICATION CABLES WITH A COMMUNICATION NETWORK

RELATED APPLICATIONS

The present application claims priority from U.S. Provisional Application Nos. 61/139,209, filed Dec. 19, 2008, and 61/222,233, filed Jul. 1, 2009, the disclosures of which are hereby incorporated herein in their entireties.

FIELD OF THE INVENTION

The present invention relates generally to networks and, more particularly, to network patching systems.

BACKGROUND

A network patching system is typically used to interconnect the various communication lines within a closet or computer room. In a conventional network patching system, the communication lines are terminated within a closet in an organized manner via one or more patch panels mounted on a rack or frame. Multiple ports are included in the patch panel, typically in some type of organized array. Each of the different ports is connected with a communications line. In small patching systems, all communications lines may terminate on the patch panels of the same rack. In larger patching systems, multiple racks may be used, wherein different communications lines terminate on different racks. Interconnections between the various communications lines are made connecting patch cords to the ports. By selectively connecting the various communications lines with patch cords, any combination of communications lines can be interconnected.

In many businesses, employee computers are assigned an IP address so that the employee, via the computer, can interface with a network. When an employee changes office locations, it may not be desirable to assign a new IP address. Rather, to preserve consistency in communications, it may be preferred that the IP address previously associated with the employee be transferred to the network port(s) in the employee's new office. To accomplish this task, patch cords in a communication closet are rearranged so that the previous IP address is now associated with his/her new office.

As employees move, and/or change positions, and/or add or subtract lines, the patch cords in a typical closet may require frequent rearrangement. Network patching systems that have the ability to sense a plug in a patch panel port or sense a connection between two patch panel ports are referred to as intelligent patching systems. Intelligent patching systems are described in U.S. Pat. No. 6,222,908, which is incorporated herein by reference in its entirety. Another current intelligent patching solution is the IPatch system, available from Systimax Solutions, Inc. (Richardson, Tex.). In the IPatch system, a circuit board is connected to the system to provide the capability of determining whether a patch cord is plugged into a particular port. Also, the circuit board is connected with a push button and an LED associated with each port to provide connectivity information and guide a technician who is tracing a connection.

This product has some potential areas for improvement, largely due to the trend in the market to increase port density from 24 ports per Rack Mounting Unit (RMU—defined as a space 19 inches in width and 1.75 inches in height) to 36 ports/RMU. The additional ports and the circuitry required for them reduce the space available for the circuit board. Also, the circuit board is mounted in the front of the panel and has a single connection to a panel bus at the rear of the rack. This connection limits the panel to only a single orientation, as opposed to the dual "Alpha/Beta" orientation shown in, for example, U.S. Pat. No. 7,416,347 to Livingston et al.

It may be desirable to provide an intelligent patching system that can offer higher port density.

SUMMARY

As a first aspect, embodiments of the present invention are directed to a datacommunications patching system. The patching system comprises: a mounting frame; a first module mounted in the mounting frame and including a plurality of connector ports on one side thereof and first and second connectors on another side thereof; and a backplane that is mounted in the mounting frame. The backplane electrically connects to the first module via the first connector when the first module is mounted in the mounting frame in a first orientation, and wherein the backplane electrically connects to the first module via the second connector when the first module is mounted in the mounting frame in a second orientation that is inverted from the first orientation. This configuration can enable the patching system to automatically detect an Alpha or Beta orientation of the module, which can then be used on conjunction with an intelligent patching system to track connectivity.

As a second aspect, embodiments of the present invention are directed to a datacommunications patching system, comprising: a mounting frame; a module mounted in the mounting frame and including a plurality of connector ports on one side thereof and first and second connectors on an opposite side thereof, wherein one of a plurality of tracer lights is associated with a respective one of each of the connector ports; and at least one dust cap inserted into one of the plurality of connector ports, the dust cap formed of a material that provides a visual indication when illuminated with a respective one of the plurality of tracer lights, and that permits the passage of infrared radiation.

As a third aspect, embodiments of the present invention are directed to a datacommunications patching system, comprising: a mounting frame; a first module mounted in the mounting frame and including a plurality of connector ports on one side thereof and first and second connectors on another side thereof; and a backplane that is mounted in the mounting frame. The backplane electrically connects to the first module via the first connector when the first module is mounted in the mounting frame in a first orientation, and wherein the backplane electrically connects to the first module via the second connector when the first module is mounted in the mounting frame in a second orientation that is inverted from the first orientation. The backplane includes circuitry configured to recognize whether the first module is in the first orientation or the second orientation. The backplane further includes a tab, and each of the first and second connectors includes a slot configured to receive the backplane tab.

BRIEF DESCRIPTION OF THE FIGURES

FIG. 5 is a schematic top view of the backplane of FIG. 2.

DETAILED DESCRIPTION

Figure 1:
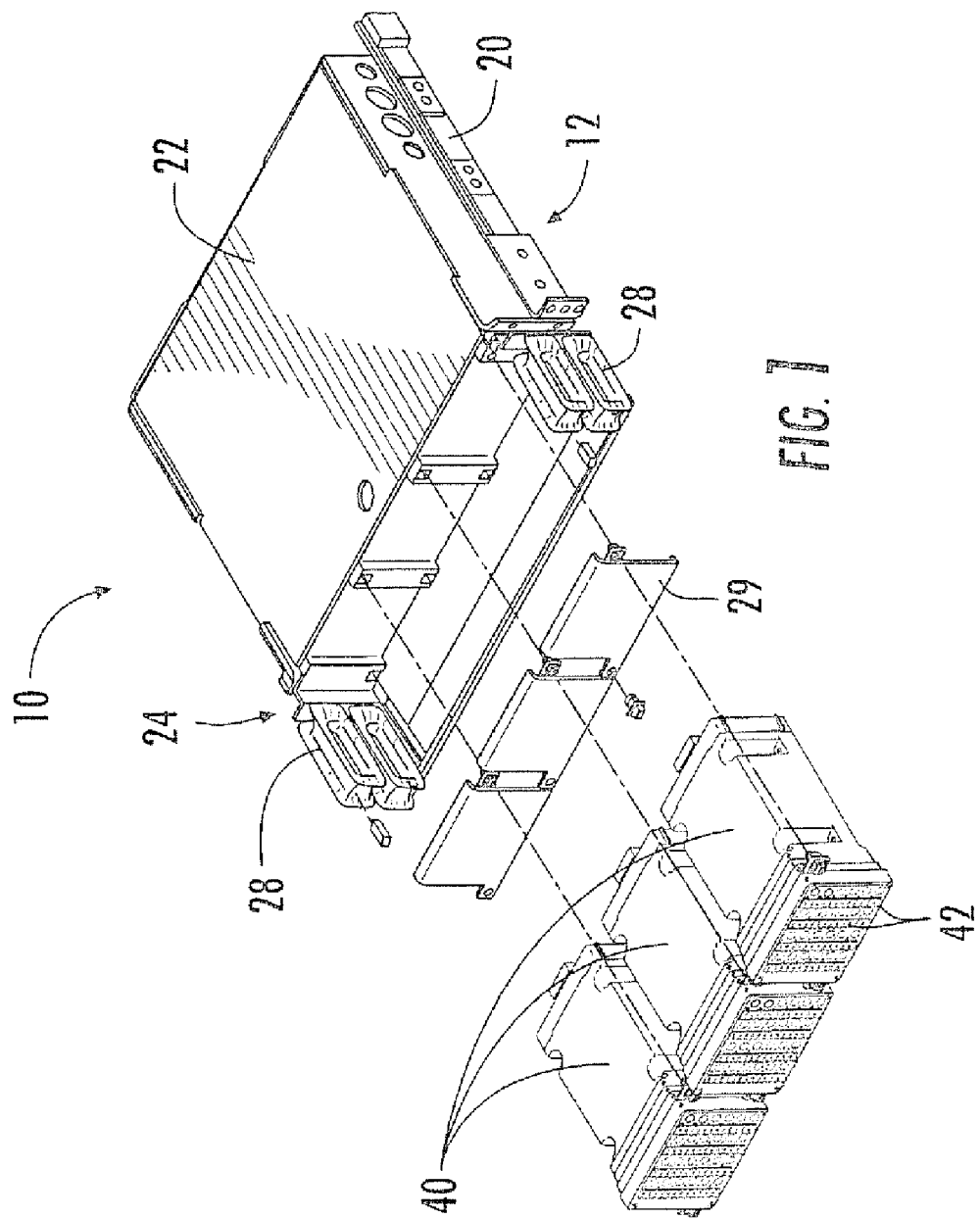
FIG. 1 is an exploded front perspective view of an intelligent patching system according to embodiments of the present invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly. As used herein, "vertical" has the conventional meaning, i.e., upright; or at a right angle to the horizon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Also, as used herein the term "port" is intended to encompass telecommunications connectors and devices employed to facilitate the interconnection of telecommunications cords and cables for the transmission of signals therebetween. A connector may include an adapter that facilitates the interconnection of two termination devices (as may be employed in the interconnection of fiber optic cords and cables, particularly within a connector block), a jack or the like typically employed with copper cables and cords, or other devices that provide a location or site for the interconnection of cables and cords.

Further, as used herein, it will be understood that, as used herein, the term "Alpha/Beta" when referring the orientation of a communications module indicates that the module may be oriented in one of two orientations (the "Alpha" orientation being 180 degrees inverted from the "Beta" orientation), wherein cords and cables may be connected with the module in either orientation, but the numbering system of the ports of the module and the connectivity with other devices differs with the orientation. An exemplary "Alpha/Beta" orientation is described in greater detail in U.S. Pat. No. 7,416,347 to Livingston et al., supra.

Turning now to the figures, a patching system, designated broadly at 10, is illustrated in FIG. 1. The patching system 10 includes a shelf 12 and three port modules 40 (more or fewer modules 40 may be included in other embodiments). These components are described in greater detail below.

Figure 2:
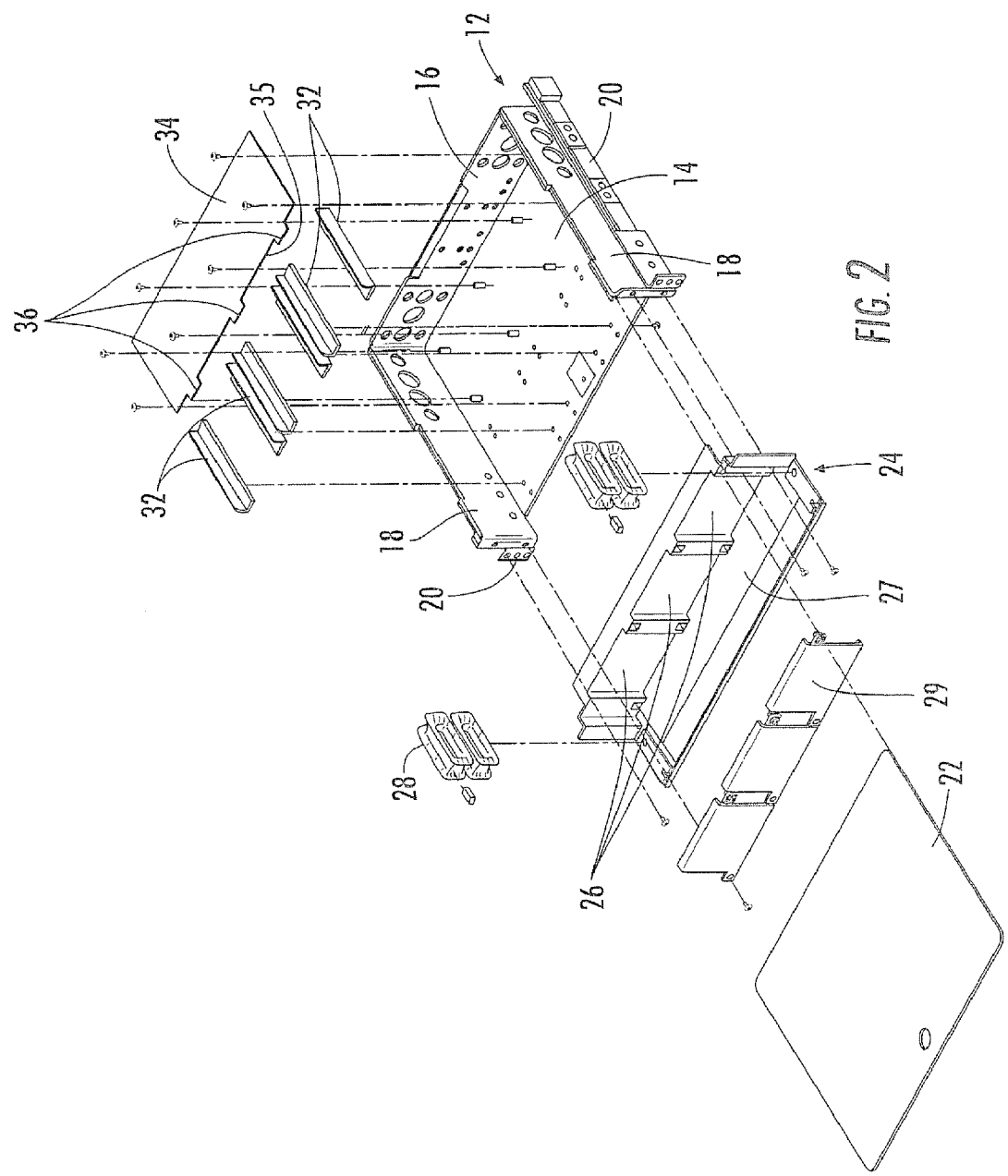
FIG. 2 is an exploded front perspective view of the shelf and backplane of the patching system of FIG. 1.

Turning now to FIGS. 1 and 2, the shelf 12 includes a generally horizontal main panel 14, a rear wall 16, side walls 18, and a cover 22. Together these panels form a box structure with an open front end. Slide members 20 are attached to each of the side walls 18 and enable the shelf to slide forward from a rack on which it is mounted (not shown) for work by a technician. Four module guides 32 are mounted to the main panel 14 generally parallel to the side walls 18 and spaced apart from each other. With the cover 22 in place, the shelf 12 has a height of approximately 2 RMU.

A trough 24 is attached to the front edges of the side walls 18 and main panel 14. The trough 24 has three module openings 26 that are configured to receive modules 40. Also, the trough 24 includes a pair of cable loops 28 on each side that are configured and oriented to receive cables and cords inserted into adapters 42 in the modules 40. A front window 27 is positioned below and in front of the module openings 26. FIGS. 1 and 2 also illustrate module doors 29 that can be placed over the module openings 26 when a module 40 is not present.

Those skilled in this art will appreciate that, although the shelf 12 is illustrated and described herein, mounting frames of different configurations may also be employed with embodiments of the present invention.

Referring still to FIG. 2, a backplane 34 is mounted to and positioned above the rear portion of the main panel 14. The backplane 34 includes three connection tabs 36 on its front edge 35. As can be seen in FIG. 5, the backplane 34 comprises a printed wiring board that includes circuitry that monitors the connectivity of ports 42 in the modules 40. Exemplary circuitry for "intelligent" patching is known to those of skill in this art and need not be described in detail herein.

The backplane 34 further includes circuitry that can detect the orientation (i.e., Alpha or Beta) of the modules 40. Such circuitry may comprise, for example, contact pads that are positioned to detect different mating contacts in connectors of the module 40 (described in greater detail below). Other configurations may also be suitable for other embodiments of the present invention.

Figure 3:
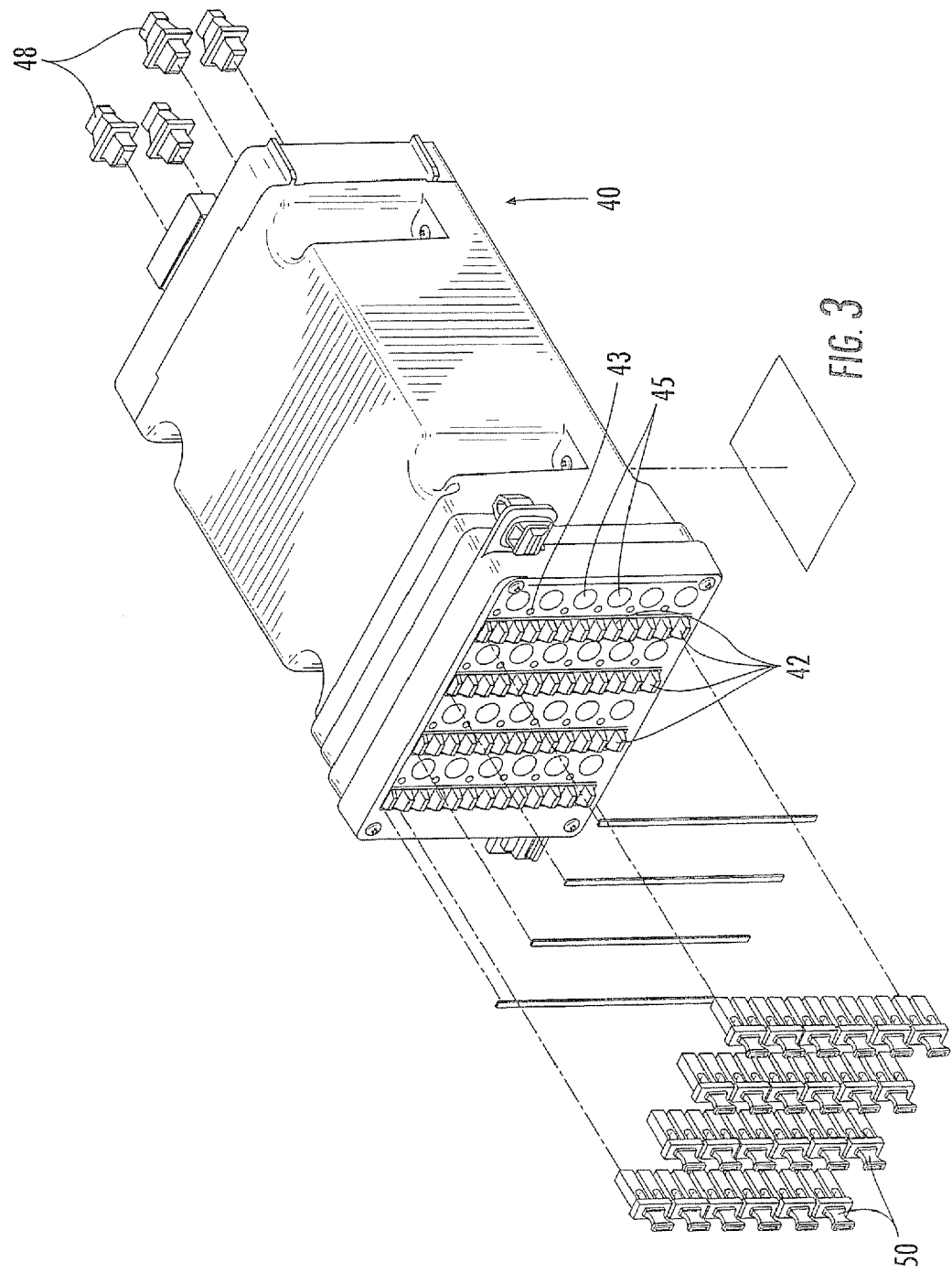
FIG. 3 is a greatly enlarged front perspective view of an exemplary port module of the patching system of FIG. 1.

Referring now to FIG. 3, each of the modules 40 includes a plurality of fiber optic adapters 42. In the illustrated embodiment, the adapters 42 are disposed in an array of 6 rows and 4 columns, although other arrangements may be employed. The individual adapters 42 are oriented such that they are vertically oriented. A "vertically oriented" adapter is one in which its keyway, which accepts a mating key on a mating terminal, is located in a vertical wall or edge of it opening. This arrangement is a 90 degree re-orientation from conventional adapters. Those skilled in this art will recognize that, although fiber optic adapters are shown herein, other varieties of datacommuncations ports and/or connectors may also be employed.

In this embodiment, each adapter 42 is monitored by an infrared (IR) sensor that detects the presence of a connector in the adapters 42. Each adapter 42 also has a corresponding LED 43 that helps to guide a technician to the correct adapter 42 during maintenance and a push button 45 that assists with connectivity operations.

Figure 4:
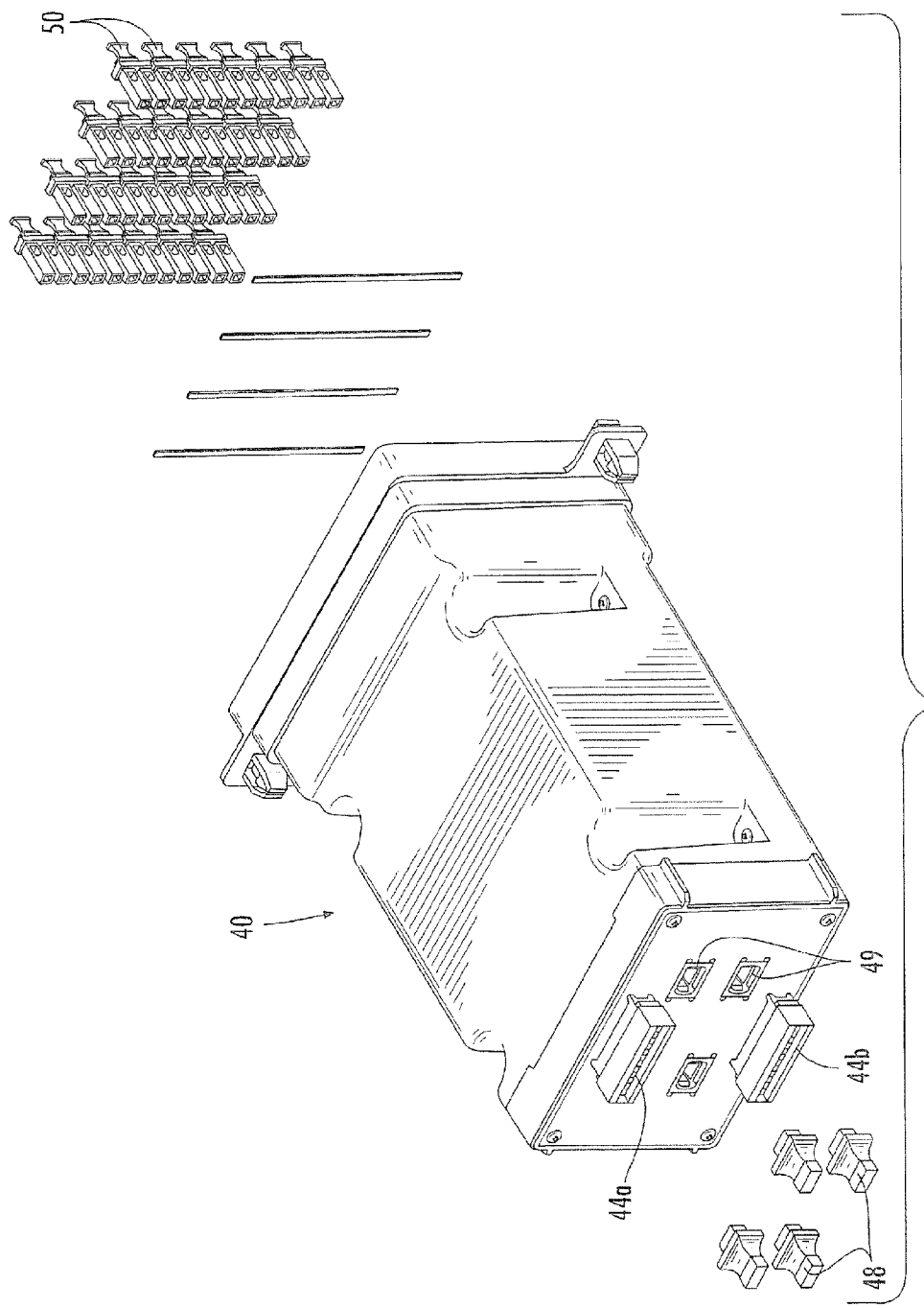
FIG. 4 is a greatly enlarged rear perspective view of the port module of FIG. 3.

Referring now to FIG. 4, the rear surface of each of the modules 40 includes two different connector slots 44a, 44b. Each of the connector slots 44a, 44b is sized to receive one of the connection tabs 36. The connector slots 44a, 44b are located on the module 40 so that, when the module 40 slides through one of the module openings 26 and toward the backplane 34, one of the connector slots 44a, 44b is positioned to receive the connection tab 36. If the module 40 is in an "Alpha" orientation, the connection tab 36 is inserted in the connector slot 44a; if instead the module 40 is in a "Beta" orientation (i.e., inverted 180 degrees from the Alpha orientation), the connection tab 36 is inserted into the connector slot 44b. The module guides 32 are positioned to encourage straight-line entry of the module 40 into and through the module openings 26 so that the proper connector slot 44a, 44b aligns with and enables insertion of the connection tab 36.

FIG. 4 also illustrates fiber optic adapters 49, which are attached to cables (not shown) and are mounted on the rear side of the module 40.

Those skilled in this art will appreciate that, although the adapters 42 and the connector slots 44a, 44b are shown on the front and rear of the module 40, these components may be positioned on other sides of the module 40 (for example, on the top and bottom of the module).

Connection of the connection tab 36 with a connector slot 44a, 44b allows the backplane 34 to recognize the Alpha/Beta orientation of the module 40. For example, the connector slot 44a may include a contact in one position (e.g., the leftmost portion), whereas the connector slot 44b may include a contact in another location (e.g., the rightmost portion). When the connector slot 44a receives a tab 36 with multiple contact pads. a mating contact pad on the tab 36 can detect the contact of the connector slot 44a and thus determine that the module 40 is in an Alpha orientation. Conversely, if the connector slot 44b receives the tab 36, a different mating contact pad on the tab 36 detects the differently located contact of the connector slot 44 and determines that the module 40 is in a Beta configuration. This information about the module orientation can then be used in conjunction with intelligent patching circuitry on the backplane 34 to correctly track and monitor the connectivity of the ports 42 of the module 40.

As discussed, the adapters 42 are fiber optic adapters that receive fiber optic connectors. Such adapters typically include some means, such as dust caps 50 (FIGS. 3 and 4). for preventing dust from entering the adapter when the adapter is not in use. A conventional dust cap is inserted into the adapter to prevent the accumulation of dust. However, when an IR-based port detection technique is employed by an intelligent patching system, the system can misinterpret a typical dust cap inserted in an adapter as a connector. To address this issue, in some embodiments the dust caps are formed of a material that is translucent to IR radiation. Such dust caps can allow an IR beam transmitted across the adapter 49 to pass and avoid signaling the presence of an object to the backplane 34.

In some embodiments, it may be desirable for the dust cap material to compliment the intelligent system during installation, maintenance and connection. Some patching systems include a tracer light (often red) to indicate the status of the particular adapter. The dust cap material may be chosen to reveal the tracer light, or to glow, when the tracer light is activated. Such a configuration can enable an operator to see the light without removing the dust cap, which can significantly simplify installation.

Exemplary materials for the dust cap include a thermoplastic elastomer (TPE), and in particular ethylene-propylene copolymers. A particularly suitable material is DYNAFLEX® G2780-001 TPE, available from GLS Corporation. McHenry, Ill. This material is also ROHAS compliant, and meets zero halogen requirements demanded in some applications.

The foregoing embodiments are illustrative of the present invention, and are not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A datacommunications patching system, comprising:
 a mounting frame;
 a first module mounted in the mounting frame and including a plurality of connector ports on one side thereof and first and second connectors on another side thereof; and
 a backplane that is mounted in the mounting frame;
 wherein the backplane electrically connects to the first module via the first connector when the first module is mounted in the mounting frame in a first orientation, and wherein the backplane electrically connects to the first module via the second connector when the first module is mounted in the mounting frame in a second orientation that is inverted from the first orientation; and
 wherein the backplane includes circuitry configured to recognize whether the first module is in the first orientation or the second orientation.

2. The patching system defined in claim 1, wherein the backplane includes a tab, and each of the first and second connectors includes a slot configured to receive the backplane tab.

3. The patching system defined in claim 1, further comprising a second module mounted in the mounting frame and including a plurality of connector ports on one side thereof and third and fourth connectors on another side thereof;
 wherein the backplane electrically connects to the second module via the third connector when the second module is mounted in the mounting frame in a first orientation, and wherein the backplane electrically connects to the second module via the fourth connector when the second module is mounted in the mounting frame in a second orientation that is inverted from the first orientation.

4. The patching system defined in claim 1, wherein the connector ports are fiber optic adapters.

5. The patching system defined in claim 4, wherein each of the fiber optic adapters includes a vertical edge, and wherein the vertical edge includes a keyway recess.

6. The patching system defined in claim 5, wherein each of the first and second connectors includes a slot that is horizontally oriented.

7. The patching system defined in claim 1, wherein the backplane includes circuitry configured to identify whether a respective port of the plurality of ports on the first module is connected with a mating connector.

8. The patching system defined in claim 1, further comprising at least one dust cap inserted into one of the plurality of connector ports.

9. The patching system defined in claim 8, wherein the dust cap is formed of a material that provides a visual indication when illuminated with a tracer light, and that permits the passage of infrared radiation.

* * * * *